US007857472B2

United States Patent
Ko et al.

(10) Patent No.: US 7,857,472 B2
(45) Date of Patent: Dec. 28, 2010

(54) BACKLIGHT SOURCE HAVING FIRST AND SECOND ELECTROLUMINESCENCE DEVICES

(75) Inventors: Ya-Hua Ko, Changhua County (TW); Chih-Kuang Chen, Kaohsiung (TW); Hsin-Wu Lin, Tainan (TW)

(73) Assignee: Au Optronics Corp., Hsinchu (TW)

( * ) Notice: Subject to any disclaimer, the term of this patent is extended or adjusted under 35 U.S.C. 154(b) by 331 days.

(21) Appl. No.: 11/806,633

(22) Filed: Jun. 1, 2007

(65) Prior Publication Data

US 2008/0042555 A1 Feb. 21, 2008

(30) Foreign Application Priority Data

Aug. 15, 2006 (TW) .............................. 95129971 A

(51) Int. Cl.
*F21V 9/16* (2006.01)
*G09F 13/08* (2006.01)

(52) U.S. Cl. ........................ 362/84; 362/97.1; 362/231

(58) Field of Classification Search ................... 362/84, 362/97.1, 97.2, 97.3, 97.4, 231, 236, 240, 362/242, 330, 613, 555, 230; 313/498, 501, 313/512

See application file for complete search history.

(56) References Cited

U.S. PATENT DOCUMENTS

| 6,478,447 | B2 * | 11/2002 | Yen ............................ 362/231 |
|---|---|---|---|
| 7,185,995 | B2 * | 3/2007 | Hatanaka et al. ............. 362/29 |
| 7,204,607 | B2 * | 4/2007 | Yano et al. ................... 362/231 |
| 7,229,199 | B2 * | 6/2007 | Lee et al. ..................... 362/561 |
| 7,461,948 | B2 * | 12/2008 | van Voorst Vader et al. . 362/244 |
| 2006/0067074 | A1 * | 3/2006 | Lin ............................. 362/244 |

\* cited by examiner

*Primary Examiner*—Bao Q Truong
(74) *Attorney, Agent, or Firm*—Birch, Stewart, Kolasch & Birch, LLP

(57) ABSTRACT

A backlight source has different luminescence types of electroluminescence devices and coordinates at least one of the arrangement positions and the arrangement spacing of the electroluminescence devices to improve the brightness uniformity of the backlight source and make the mixed light better. Moreover, because of the brightness uniformity promotion, the overall thickness of backlight module can be reduced.

16 Claims, 5 Drawing Sheets

BACKLIGHT SOURCE HAVING FIRST AND SECOND ELECTROLUMINESCENCE DEVICES

BACKGROUND OF THE PRESENT INVENTION (1) Field of the Present Invention

The present invention relates to a backlight source and, more particularly, to a backlight source with at least two kinds of electroluminescence devices.

(2) Description of the Prior Art

Following the advancement of the display technique, the liquid crystal display (LCD) is widely applied to substitute for traditional CRT monitor. The LCD is very popular by the consumer, since its light weight, small volume, and low-radiation. The LCD has been regarded as the mainstream product at present, and widely applied to many electronic products, such as computer, personal digital assistant (PDA), laptop, digital camera, and mobile phone.

Because the LCD is a non-self-luminous display device, the LCD cannot provide bright image actively. Thus, the LCD needs a backlight module to provide illumination of the image. Generally speaking, the luminous character of the backlight source is highly bright and uniform. Furthermore, the light emitting angle of the backlight module affects the usage efficiency of light and the angle of view directly. Therefore, the development of the backlight module technique is an important factor to develop LCD in the future.

The conventional backlight module uses the cold cathode fluorescent lamp (CCFL) as the backlight source. Because of the environmental consciousness raising in recent years, the CCFL with mercury is gradually substituted with the LED due to the characteristics of power saving, environmental protection, small volume, high color purity, good reliability, and long life.

Because of the rapid development of the LED, the luminous efficiency is greatly promoted. The high color purity of the LED substantially improves the vividness, chroma, and tone of color, and increases the range of color, thereby to achieve better color performance.

The LED used in the conventional direct type backlight module is Lambertian luminescence type or so-called upward light type. Referring to FIG. 1A, which illustrates the optical field distribution of the luminescence type of a single upward light type. The luminescence type is radial type, and the luminescence type is similar to the Lambertian model of the Lambertian luminescence type.

For the directly type of a backlight module, the backlight source has a backlight source cavity 2, a plurality of LEDs 1 disposed inside the backlight source cavity 2, and a diffuser plate 4 disposed above the backlight source cavity 2.

Referring to FIG. 1B, which illustrates a part view of a conventional backlight source. The arrangement configuration of the LEDs 1 inside the backlight source cavity 2 is an array type and each LED has a light type is the same each other.

Referring to FIG. 1C, which illustrates the luminous intensity distribution of a section a-a' in FIG. 1B. Due to the influence of the luminescence type, angle of light type, brightness, and the arrangement spacing of the LEDs 1, and when the overall thickness of backlight module being reduced, the brightness uniformity of the backlight module is then decreased and appear a staggered dark band. The dark band is the region of a concave wave shape in FIG. 1C. The dark band phenomenon lowers the quality of the image.

Therefore, under the trend of the tiny and high quality LCD, how to improve the brightness uniformity of the backlight module is an important task.

SUMMARY OF THE PRESENT INVENTION

An objective of the present invention is to provide a backlight source. The backlight source has at least two substantially different luminescence types of electroluminescence devices and coordinates at least one of the arrangement positions and the arrangement spacing of the electroluminescence devices to improve the brightness uniformity of the backlight source and make the mixed light better. Moreover, the overall thickness of backlight module can be reduced, due to the brightness uniformity promotion.

The backlight source of the present invention comprises at least one first electroluminescence device (ELD) and a plurality of second electroluminescence devices.

The first electroluminescence device generates light with a first luminescence type. The second electroluminescence devices are disposed around the first electroluminescence device, and the second electroluminescence devices generate light with a second luminescence type. Wherein the light with the first luminescence type is substantially different from the light with the second luminescence type, and the light with the first luminescence type and the light with the second luminescence type are substantially complementary each other.

The backlight source of the present invention comprises at least one 4×4 second electroluminescence device array and at least one first electroluminescence device.

In the 4×4 second electroluminescence device array, a bright region is generated over each of second electroluminescence devices, and a dark region is generated between the two adjacent second electroluminescence devices.

The first electroluminescence device is disposed inside the 4×4 second electroluminescence device array. A bright region generated by the first electroluminescence device is distributed over the dark region between the most outer layer of the 4×4 second electroluminescence device array and the secondary outer layer of the 4×4 second electroluminescence device array.

The backlight source of the present invention comprises at least one 2×2 second electroluminescence device array and at least one first electroluminescence device.

In the 2×2 second electroluminescence device array, a bright region is generated over each of second electroluminescence devices, and a dark region is generated between two adjacent the second electroluminescence devices.

The first electroluminescence device is disposed inside the 2×2 second electroluminescence device array. A bright region generated by the first electroluminescence device is distributed over the dark region between the most outer layer of said 2×2 second electroluminescence device array and the secondary outer layer of said 2×2 second electroluminescence device array.

These and other objectives of the present invention will no doubt become obvious to those of ordinary skill in the art after reading the following detailed description of the preferred embodiment, which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 2A:
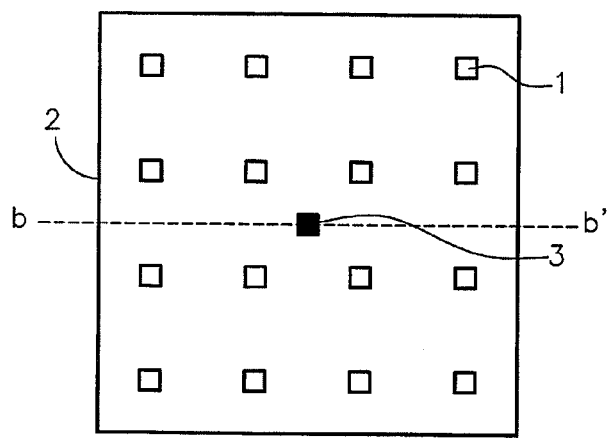
FIG. 2A illustrating a top-view of a backlight source according to the present invention.

Referring to FIG. 2A, which illustrates a top-view of a backlight source according to the present invention. The backlight source of the present invention comprises at least one first electroluminescence device (ELD) 3 and a plurality of second electroluminescence devices 1. The first electroluminescence device 3 and the second electroluminescence devices 1 are all disposed inside the backlight source casing 2.

Figure 2B:
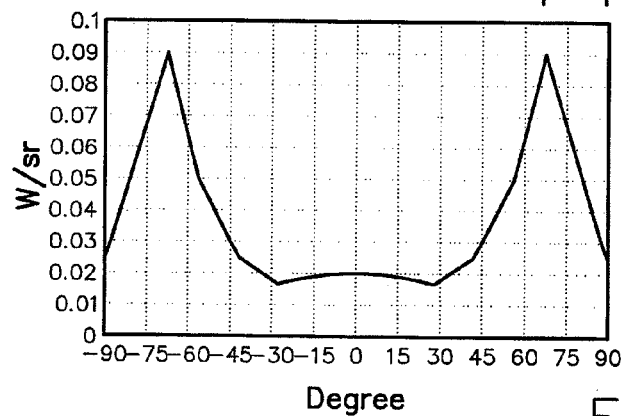
FIG. 2B illustrating the optical field distribution of the first luminescence type of a single first electroluminescence device.

Wherein, the first electroluminescence device 3 generates light with a first luminescence type. Referring to FIG. 2B, which illustrates the optical field distribution of the first luminescence type of the single first electroluminescence device 3. The first luminescence type comprises a side light type, and the maximum luminous intensity of the first electroluminescence device 3 is located at an absolute value of about 70 degrees. In other words, the maximum luminous intensity of the first electroluminescence device 3 is located at plus or minus about 70 degrees.

Figure 1:
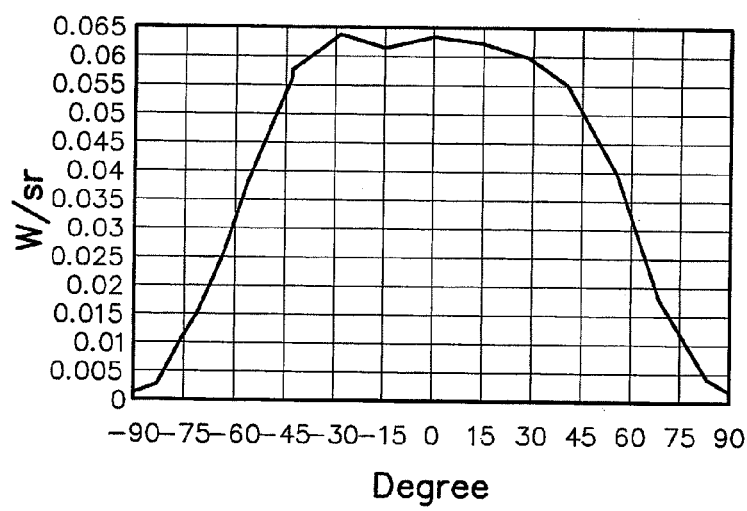
FIG. 1A illustrating the optical field distribution of luminescence type of a single upward light type LED.
FIG. 1B illustrating a part view of a conventional backlight source.
FIG. 1C illustrating the luminous intensity distribution of a section a-a' in FIG. 1B.
Figure 1:
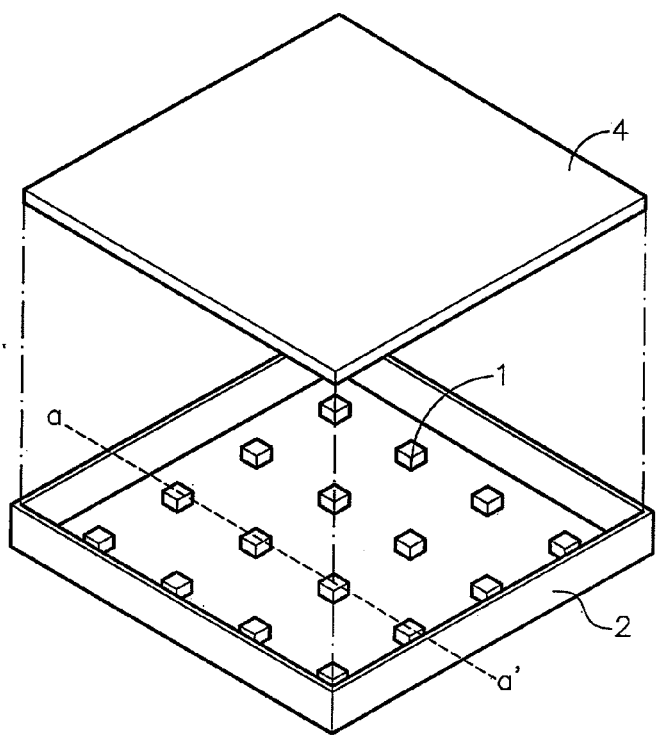

The second electroluminescence devices 1 are disposed around the first electroluminescence device 3, and the second electroluminescence device generates light with a second luminescence type. Referring to FIG. 1A, which illustrates the optical field distribution of the second luminescence type of the second electroluminescence device 1. The second luminescence type comprises an upward light type or an Lambertian light type.

Therefore, according to FIG. 1A and FIG. 2B, the light with the first luminescence type is substantially different from the light with the second luminescence type, and the light with the first luminescence type and the light with second luminescence type, preferred, are substantially complementary each other.

In practical application, at least one of the first electroluminescence device 3 and the second electroluminescence device 1 comprises an inorganic electroluminescence device, an organic electroluminescence device, or combinations thereof. The ratio of the first electroluminescence devices 3 to the second electroluminescence devices is not a specific limitation, such as m:n, in which m, n is a positive integer of the first electroluminescence and the second electroluminescence, respectively, and least one of n and m is great than or equal to 1, for example, 1:1, 1:10000, 2:3, 3:4, 3:5, 1:2, 1:3, 1:4, 1:5, 1:6, 1:100, 1:200, 1:300, 1:50, 1:10, 4:5, 5:6, 7:8, etc., and the ratio can be adjusted according to the brightness uniformity of the backlight source. In one embodiment of the present invention, the ratio of the first electroluminescence devices 3 to the second electroluminescence devices, for example, is about 1:16 or 1:4, but not-limited it.

Referring to FIG. 2A, which is the above embodiment. For example, the backlight source comprises at least one 4×4 second electroluminescence device array and at least one first electroluminescence device 3.

In the backlight source, a bright region is generated over each of the second electroluminescence devices 1, and a dark region is generated between the two adjacent second electroluminescence devices 1.

The first electroluminescence device 3 is disposed inside the 4×4 second electroluminescence device array. A bright region generated by the first electroluminescence device 3 is distributed over the dark region between the most outer layer of the 4×4 second electroluminescence device 1 array and the secondary outer layer of the 4×4 second electroluminescence device 1 array. As a result, the brightness of the dark region can be enhanced and the brightness of the backlight source is substantially more uniform.

Figure 1C:
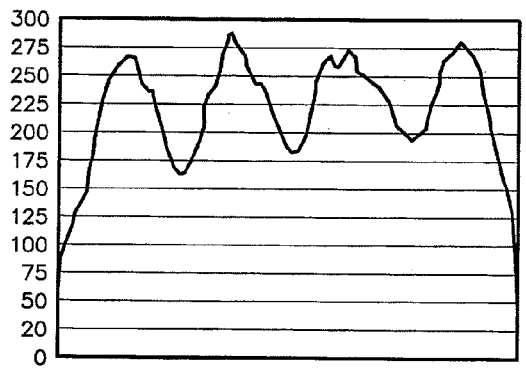
Figure 2C:
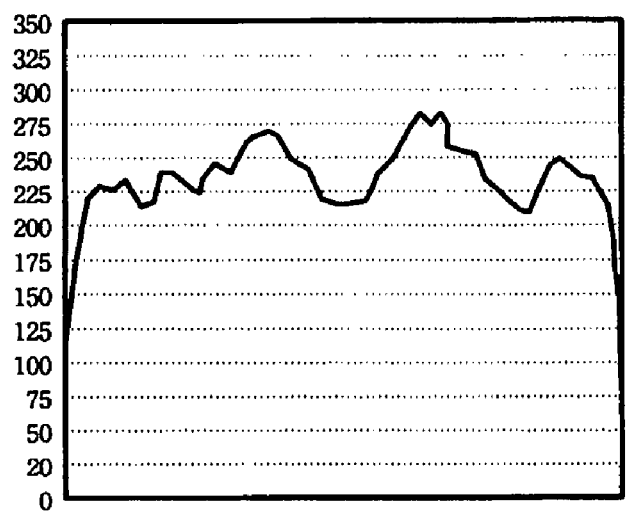
FIG. 2C illustrating the luminous intensity distribution of a section b-b' in FIG. 2A.

Referring to FIG. 2C, which illustrates the luminous intensity distribution of a section b-b' in FIG. 2A. The waveform in FIG. 2C is substantially smoother than the waveform in FIG. 1C. That is, the dark region phenomenon has improved, and the brightness of the backlight source is substantially more uniform.

Figure 3:
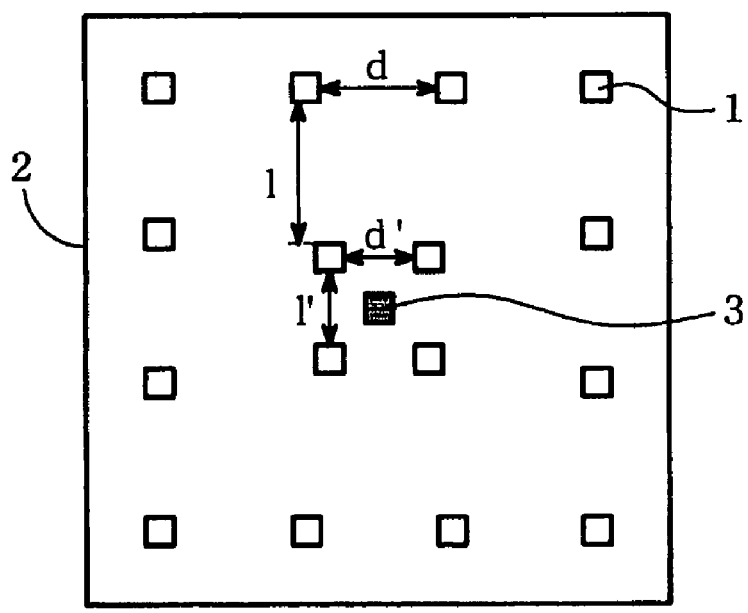
FIG. 3 illustrating a part view of the arrangement spacing of the electroluminescence devices according to the present invention.

Referring to FIG. 3, which illustrates a part view of the arrangement spacing of the electroluminescence devices according to the present invention. Due to the maximum luminous intensity of the first electroluminescence device 3, for example, is located at about plus or minus about 70 degrees, the bright region generated by the first electroluminescence device 3 distributes between the most outer layer of the 4×4 second electroluminescence device 1 array and the secondary outer layer of the 4×4 second electroluminescence device array. In the above-mentioned bright region, the brightness of the region adjacent to the first electroluminescence device 3 is substantially smaller than the brightness of the region distant from the second electroluminescence device 3. Therefore, the second electroluminescence devices 1 adjacent to the first electroluminescence device 3 are arranged closely, thereby the regional brightness adjacent to the first electroluminescence device 3 and the regional brightness distant from the first electroluminescence device 3 are substantially uniform.

As shown in FIG. 3, the horizontal interval of the two adjacent second electroluminescence devices 1 adjacent to the first electroluminescence device 3 is defined as "d", the horizontal interval of the two adjacent second electroluminescence devices distant from the first electroluminescence device is defined as "d'", and the ratio of d/d' is substantially greater than or substantially equal to 1.0.

Or, the vertical interval of the two adjacent second electroluminescence devices adjacent to the first electroluminescence device is defined as "l'", the vertical interval of the two adjacent second electroluminescence devices distant from the first electroluminescence device is defined as "l'", and the ratio of l/l' is substantially greater than or substantially equal to 1.0.

In another words, the vertical interval and the horizontal interval can be adjusted or arranged according to the brightness uniformity of the backlight source. For example, the ratio (d/d') of the horizontal interval is substantially equal to 1.0 while the ratio (l/l') of the vertical interval is substantially greater than 1.0, contrariwise. Or/And, the ratio (d/d') of the horizontal interval and the ratio (l/l') of the vertical interval is substantially equal to 1.0, respectively, as shown in FIG. 2A.

In the backlight source, the interval between the two adjacent second electroluminescence devices 1 distant from the first electroluminescence device 3 is substantially greater than the interval between the two adjacent second electroluminescence devices 1 adjacent to the first electroluminescence device 3. That is, the interval between the two adjacent electroluminescence devices 1 in the inner layer of the 4×4 second electroluminescence device 1 array is substantially smaller than the interval between two adjacent electroluminescence devices 1 in the outer layer of the 4×4 second electroluminescence device 1 array.

Figure 4:
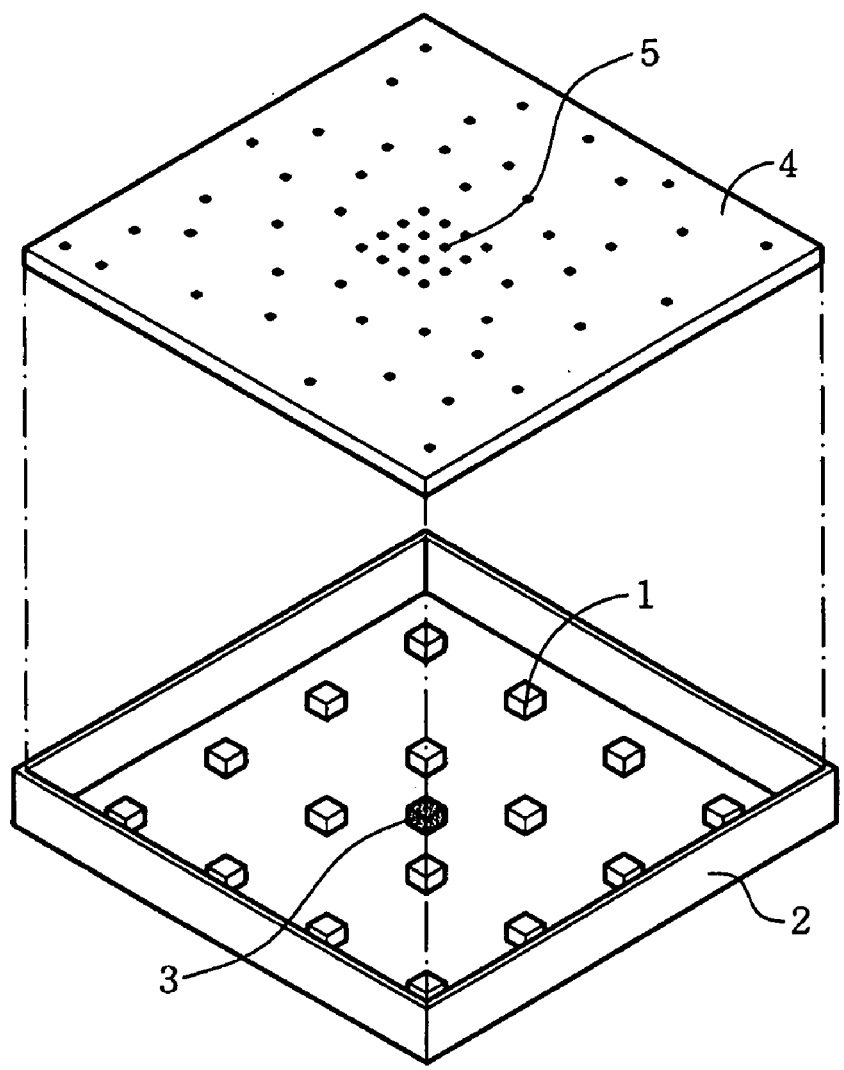
FIG. 4 illustrating a part view of the backlight source according to the present invention.

Referring to FIG. 4, which illustrates a part view of the backlight source according to the present invention. The backlight source, preferred, further comprises a diffuser plate 4 disposed above the casing 2, but not limited it, can be selectively not used. There are many patterns 5 on the diffuser plate 4, which can scatter, refract, or reflect the light generated from the first electroluminescence device 3 and second electroluminescence device 1, thereby to cause the effect of optical diffusion. It is noted that, the density of the patterns corresponding to the first electroluminescence device 3, preferred, is substantially greater than the density of the patterns corresponding to outside of the first electroluminescence device 3, but not-limited it, can be selectively not used. That is, the patterns adjacent to the first electroluminescence device 3 is substantial densely; the density of the patterns distant from the first electroluminescence device 3 is substantially non-densely, but not limited it, can be selectively not used.

Besides, the backlight source, preferred, further comprises at least one optical film (not shown) disposed above the diffuser plate 4, but not limited it, can be selectively not used. The optical film comprises at least one of a diffuser plate, a diffuser film, a brightness enhancement film, a prism film, a polarization plate, other film, or combinations thereof. The optical film is used to make more light from the diffuser plate 4 be guided to the upward direction, thereby to enhance the brightness of the upward direction, wherein the upward direction is the normal direction of the diffuser plate 4. Accordingly, the diffuser plate 4 and the optical film can provide the backlight module has a substantially uniform and highly bright plane light.

Figure 5:
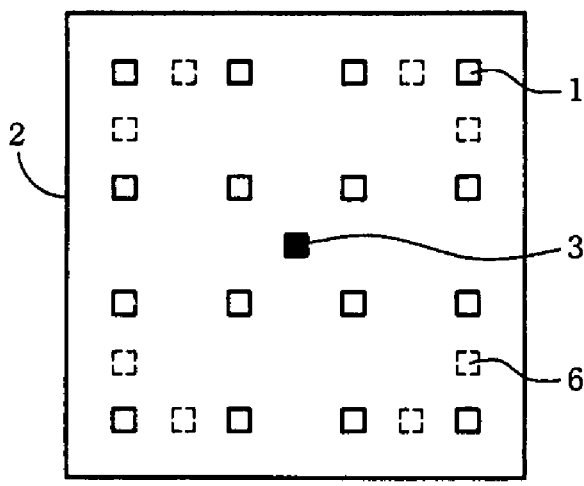
FIG. 5 illustrating a top-view of the backlight source according to one embodiment of the present invention.

Referring to FIG. 5, which illustrates a top-view of the backlight source according to another embodiment of the present invention. The configuration of the backlight source is similar to FIG. 2A and FIG. 3. This embodiment further comprises at least one third electroluminescence device 6, and third electroluminescence device 6, for example, comprises an upward light type of electroluminescence device or other light type of electroluminescence device in this embodiment is substantially different from at least one of the light type of the second electroluminescence device 3 and the first electroluminescence devices 1. The third electroluminescence device 6, for example, is disposed between any of the two adjacent electroluminescence devices 1 of the 4×4 second electroluminescence device array, which can improve the dark region phenomenon between any of the two adjacent electroluminescence devices 1 and make the brightness of the backlight source more uniform, but not-limited it, the third electroluminescence device 6 can be selectively disposed between the first electroluminescence device 3 and the second electroluminescence device 3.

Figure 6A:
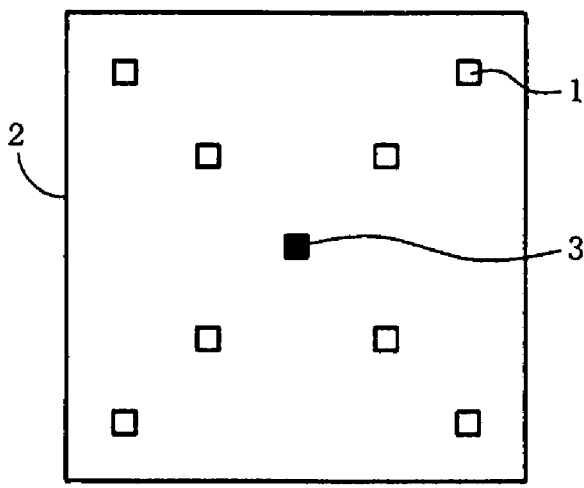
FIG. 6A illustrating a top-view of the backlight source according to another embodiment of the present invention.
Figure 6B:
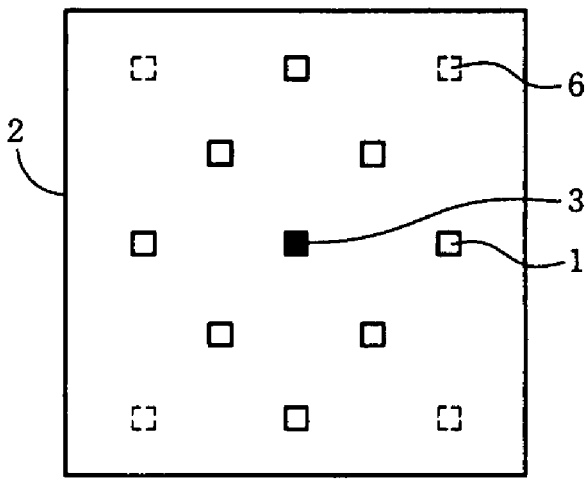
FIG. 6B illustrating a top-view of the backlight source according to another embodiment of the present invention.

Referring to FIG. 6A and FIG. 6B, which illustrates a top-view of the backlight source according to another embodiment of the present invention, wherein the ratio of the first electroluminescence devices 3 to the second electroluminescence devices 1, for example, is 1:4. The backlight source of the present invention, for example, comprises at least one 2×2 second electroluminescence device 1 array and at least one first electroluminescence device 3. The above electroluminescence devices are all disposed inside the backlight source casing 2.

In the backlight source of this embodiment, a bright region is generated over each of the second electroluminescence devices 1, and a dark region is generated between the two adjacent second electroluminescence devices 1.

The first electroluminescence device 3 is disposed inside the 2×2 second electroluminescence 1 device array. A bright region generated by the first electroluminescence device 3 is distributed over the dark region between the most outer layer of the 2×2 second electroluminescence device I array and the secondary outer layer of the 2×2 second electroluminescence device 1 array. As a result, the brightness of the above dark region can be enhanced and the brightness of the backlight source is more uniform.

It is noted that, the 2×2 second electroluminescence device array of the backlight source in FIG. 6A and FIG.6B both have two layer arrays, but the arrangement configuration are substantially different. The arrangement of two layer arrays in FIG. 6A is substantially radial configuration. The arrangement of two layer arrays in FIG. 6B is substantially staggered configuration. Of course, other arrangement configuration is feasible, such as substantially rhombus, substantially rectangle, or other configurations, or combinations thereof.

The character of the first electroluminescence devices 3 and the second electroluminescence devices 1 of the embodiment, for example, are the same described with the above-mentioned embodiment. The first electroluminescence device 3, for example, comprises a side light luminescence type. The second electroluminescence device 1, for example, comprises an upward light luminescence type or an Lambertian light type luminescence type. In practice, at least one of the first electroluminescence device 3 and the second electroluminescence device 1 comprises an inorganic electroluminescence device, an organic electroluminescence device, or combinations thereof.

The present embodiment is similar to the above-mentioned embodiment, due to the luminescence type of the first electroluminescence device 3 and the second electroluminescence device 1, the second electroluminescence devices 1 adjacent to the first electroluminescence device 3 are arranged closely, thereby the regional brightness adjacent to the first electroluminescence device 3 and the regional brightness distant from the first electroluminescence device 3 are substantially uniform. In other words, the interval between two adjacent electroluminescence devices 1 in the inner layer of the 2×2 second electroluminescence device 1 array is substantially smaller than the interval between two adjacent electroluminescence devices 1 in the outer layer of the 2×2 second electroluminescence device 1 array.

The present embodiment is similar to the above-mentioned embodiment, the backlight source, preferred, further comprises a diffuser plate 4 disposed above the casing 2, but not limited it, can be selectively not used. There are many patterns 5 on the diffuser plate 4, and the density of the patterns corresponding to the first electroluminescence device 3 is substantially greater than the density of the patterns corresponding to outside of the first electroluminescence device 3. That is, the density of the patterns adjacent to the first electroluminescence device 3, preferred, is substantial densely, but not limited it, can be selectively not used. That is, the density of the patterns distant from the first electroluminescence device 3 is substantially non-densely, but not limited it, can be selectively not used.

The backlight source of the embodiment, preferred, further comprises at least an optical film (not shown) disposed above the diffuser plate 4, for enhancing the brightness of backlight module, but not limited it, can be selectively not used. The optical film comprises at least one of a diffuser plate, a diffuser film, a brightness enhancement film, prism film, a polarization plate, or other films, or combinations thereof. Therefore, the diffuser plate 4 and the optical film can provide the backlight module has a substantially uniform and highly bright plane light.

Referring to FIG. 6B, which illustrates a top-view of the backlight source according to another embodiment of the present invention. The backlight source, preferred, further comprises at least one third electroluminescence device 6, and third electroluminescence device 6, for example, comprises an upward light type in this embodiment or other light type of electroluminescence device. The third electroluminescence device 6 is disposed between any of the two adjacent electroluminescence devices 1 of the 2×2 second electroluminescence device 1 array, which can improve the dark area phenomenon between any of the two adjacent electroluminescence devices 1 and make the brightness of the backlight source more uniform. Moreover, the location of the third electroluminescence device 6 in FIG. 6 is an example of this embodiment, but the embodiment of the present invention is not limited above, the third electroluminescence device 6 can be selectively disposed between the first electroluminescence device 3 and the second electroluminescence device 1.

Besides, it is necessary to explain that the luminescence type of the first electroluminescence devices 3 and the second electroluminescence devices 1 are a side light type and a upward light type in the above-mentioned embodiment, respectively. However, the luminescence type of the first electroluminescence devices 3 can be an upward light type and the luminescence type of the second electroluminescence devices 1 can be a side light type. Moreover, the luminescence type of the third electroluminescence devices 6 can be selectively used one of the luminescence types of the first electroluminescence device 3 and the second electroluminescence devices 1, for example, a side light type or others. Therefore, the embodiment of the present invention can be a suitable configuration and arrangement according to the requirement of brightness uniformity of the backlight source.

It is noted that, FIG. 2A, FIG. 3, FIG. 4, FIG. 5, FIG. 6A and FIG. 6B are the part view of the backlight source according to the embodiment of the present invention. In practice, the backlight source can be disposed more electroluminescence devices therein. In addition, the ratio and the arrangement configuration of the electroluminescence devices are approximately similar to the above-mentioned figures, thereby to have a uniform optical field. That is, the ratio and the arrangement configuration of the electroluminescence devices can be regularly duplicated arrangement (For example, using the design of the same embodiment.) or irregularly duplicated arrangement (For example, using the design of at least one embodiment, which comprises different embodiment. Or using the design of at least two embodiments, which comprises different embodiment. Or using the design of at least three embodiment, which comprises different embodiment).

Furthermore, although FIG. 2A and FIG. 3 do not illustrate the embodiment of the third electroluminescence device 6, the embodiment of FIG. 2A and FIG. 3 can apply the manner of FIG. 5 and FIG. 6A as well. For example, the third electroluminescence device 6 is disposed between any of the two adjacent the electroluminescence devices, thereby to improve the dark area phenomenon and make the brightness of the backlight source more uniform, as shown in FIG. 2A and FIG. 3.

It's noted that, the above-mentioned embodiments of the invention is use at least two substantially different luminescence types of electroluminescence devices as an exemplification, but not-limited it, can be selectively to use three substantially different luminescence types of electroluminescence devices, four substantially different luminescence types, and so on, or the first, second, and third electroluminescence devices with two substantially different luminescence types thereof, one of the first, second, and third electroluminescence devices is substantially equal to one of the first, second, and third electroluminescence devices or substantially different the two of the first, second, and third electroluminescence devices. In additional, one of at least two substantially different luminescence types of electroluminescence devices is a side light type, and the light peak of one of at least two substantially different luminescence types of electroluminescence devices is located at an absolute value of about 45 degrees to about 90 degrees. In other words, the light peak of the first electroluminescence device 3 is located at plus or minus about 45 degrees to plus or minus 90 degrees. Another of at least two substantially different luminescence types of electroluminescence devices is another type, and the light peak of one of at least two substantially different luminescence types of electroluminescence devices is located at an absolute value of about 0 degrees to about 45 degrees. In other words, the light peak of the first electroluminescence device 3 is located at plus or minus about 45 degrees to 0 degrees. In additional, the colors of the at least two substantially different luminescence types of electroluminescence devices is substantially identical or substantially different from, and the color comprises red, green, blue, pink, white, colorless, yellow, violet, magenta, cyan, or others in the coordinate of the international commission on illumination (CIE). Besides, the above-mentioned embodiments of the invention is use the structure of each electroluminescence device comprised assemble element disposed below a lens, the assemble has a base, a body (such as chip) disposed on the base, a resin disposed on the base and the body, preferred, a adhesion layer disposed between the body and the cavity. Sometimes, the base with a cavity, then the body disposed on the cavity of the base, the resin, disposed on the base and the body, and filled with the cavity of the base.

The above-mentioned embodiments of the backlight source can fabricate with a LCD panel, and as the backlight source of the LCD panel. Furthermore, the backlight source of the present invention can be applied to any display or luminous device, such as monitor, TV, communication product, video product, mobile product, video camera, laptop, billboard (such as indoor and/or outdoor), digital photoframe, global positioning system, e-mail send and received apparatus, game player, watch, eyeglasses, music player, head-display, automotive illumination device, head illumination device, or others, and so on.

As a conclusion, the backlight source of the present invention applies at least two different luminescence types of electroluminescence devices therein and coordinates the arrangement positions and the arrangement spacing of the electroluminescence devices to improve the brightness uniformity of the backlight source and make the mixed light better. Moreover, because of the brightness uniformity promotion, the overall thickness of backlight module can be reduced, and without the problem of non-uniform brightness.

With the example and explanations above, the features and spirits of the present invention are hopefully well described. Those skilled in the art will readily observe that numerous modifications and alterations of the device may be made while retaining the teaching of the present invention. Accordingly, the above disclosure should be construed as limited only by the metes and bounds of the appended claims.

What is claimed is:

1. A backlight source, comprising:
   a first electroluminescence device disposed on a substrate to generate a light with a side light luminescence type; and
   a plurality of second electroluminescence devices disposed on said substrate and around a center, which is said first electroluminescence device, and said second electroluminescence devices provided to generate a light with an upward light luminescence type.

2. The backlight source of claim 1, wherein said side light luminescence type of said first electroluminescence device has maximum intensity distributed at plus or minus about 70 degrees around said first electroluminescence device.

3. The backlight source of claim 1, further comprising an optical film corresponding to said first electroluminescence device and said second electroluminescence devices.

4. The backlight source of claim 1, further comprising a diffuser plate with patterns thereon, and the density of said patterns corresponding to said first electroluminescence device is substantially greater than the density of said patterns corresponding to outside of said first electroluminescence device.

5. The backlight source of claim 1, wherein an interval between two adjacent of said second electroluminescence devices distant from said first electroluminescence device is substantially greater than an interval between two adjacent of said second electroluminescence devices near to said first electroluminescence device.

6. A backlight source, comprising:
   a 4×4 second electroluminescence device array of upward type disposed on a substrate; and
   a first electroluminescence device of side light type, disposed on said substrate and in a center of said 4×4 second electroluminescence device array so as to make light distribution uniform.

7. The backlight source of claim 6, wherein four of said 4×4 second electroluminescence device array formed an inner square and the remaining formed an outer square and an interval between two adjacent of said electroluminescence devices at said inner square is substantially smaller than that of at said outer square.

8. The backlight source of claim 6, wherein said side light luminescence type of said first electroluminescence device has maximum intensity distributed at plus or minus about 70 degrees around said first electroluminescence device.

9. The backlight source of claim 6, further comprising an optical film corresponding to said first electroluminescence device and said second electroluminescence devices.

10. The backlight source of claim 6, further comprising a diffuser plate with patterns thereon, and the density of said patterns corresponding to said first electroluminescence device is substantially greater than the density of said patterns corresponding to outside of said first electroluminescence device.

11. A backlight source, comprising:
    two 2×2 second electroluminescence device arrays of an upward type disposed on a substrate; and
    a first electroluminescence device of sidelight type, disposed on a substrate and in a center point of said two 2×2 second electroluminescence device array so as to make light distribution uniform.

12. The backlight source of claim 11, wherein said two 2×2 second electroluminescence device arrays formed an inner square and an outer square.

13. The backlight source of claim 11, wherein said two 2×2 second electroluminescence device arrays formed a rhombus, and a first of said 2×2 second electroluminescence device array, each, respectively, located at four corners of said rhombus and the other of said 2×2 second electroluminescence device array, each, respectively, located at mid of four edges of said rhombus.

14. The backlight source of claim 11, wherein said side light luminescence type of said first electroluminescence device has maximum intensity distributed at plus or minus about 70 degrees around said first electroluminescence device.

15. The backlight source of claim 11, further comprising an optical film corresponding to said first electroluminescence device and said second electroluminescence devices.

16. The source of claim 11, further comprising a diffuser plate with patterns thereon, and the density of said patterns corresponding to said first electroluminescence device is substantially greater than the density of said patterns corresponding to outside of said first electroluminescence device.

* * * * *